C. H. HAPGOOD.
SCALE.
APPLICATION FILED FEB. 17, 1913. RENEWED MAR. 19, 1920.

1,402,764.

Patented Jan. 10, 1922.

UNITED STATES PATENT OFFICE.

CLARENCE H. HAPGOOD, OF TOLEDO, OHIO, ASSIGNOR, BY MESNE ASSIGNMENTS, TO TOLEDO COMPUTING SCALE COMPANY, OF TRENTON, NEW JERSEY, A CORPORATION OF NEW JERSEY.

SCALE.

1,402,764.   Specification of Letters Patent.   Patented Jan. 10, 1922.

Application filed February 17, 1913, Serial No. 748,874. Renewed March 19, 1920. Serial No. 367,207.

*To all whom it may concern:*

Be it known that I, CLARENCE H. HAPGOOD, a citizen of the United States, residing at Toledo, county of Lucas, and State of Ohio, have invented certain new and useful Improvements in Scales, of which the following is a specification.

My invention relates more particularly to platform scales designed to rest upon a floor and weigh comparatively heavy articles, though it will be understood that in many or all of its features the invention is applicable to other types of scales. It has in view more particularly the provision of means for preventing injury to the delicate parts of the scale during the shipment or use thereof, the prevention of accidental shifting of the machine as a whole when in use, the adaptation of an improved automatic load-offsetting means to scales of this type, and the provision in connection therewith of means for accurately and conveniently weighing lighter articles and quantities of commodities for which the main mechanism is not sufficiently sensitive. Other objects and features of the invention will appear from the following description and claims. It is to be understood, however, that the disclosure of specific forms of my invention is for the purpose of exemplification only, although the preferred forms are illustrated and described, and that for a definition of the scope of the invention resort must be had to the claims in which I have endeavored to differentiate the invention from the prior art without, however, relinquishing or abandoning any of my rights thereunder.

In the accompanying drawings I have shown two forms of my invention, of which one differs from the other only in the provision of means for weighing lighter articles and commodities, as referred to above. Fig. 8 is a front elevation partly in vertical section of the upper portion of the machine, showing the modification for weighing lighter articles above referred to.

Figure 6:
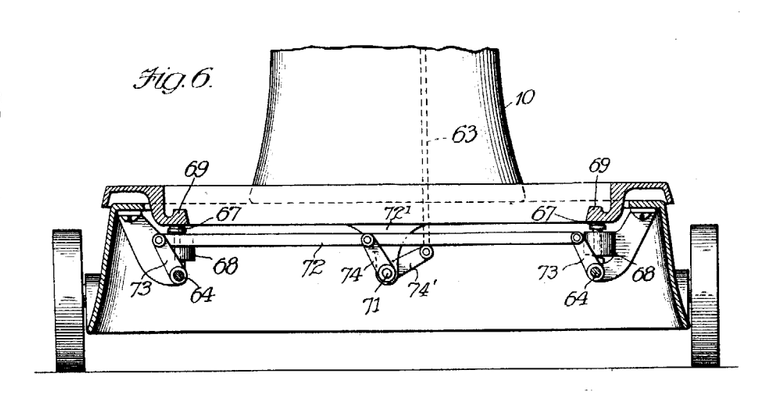
Fig. 6 is a vertical section at right angles to the plane of Fig. 5 upon the line 6—6 of Fig. 5, parts being omitted for the sake of clearness.
Figure 7:
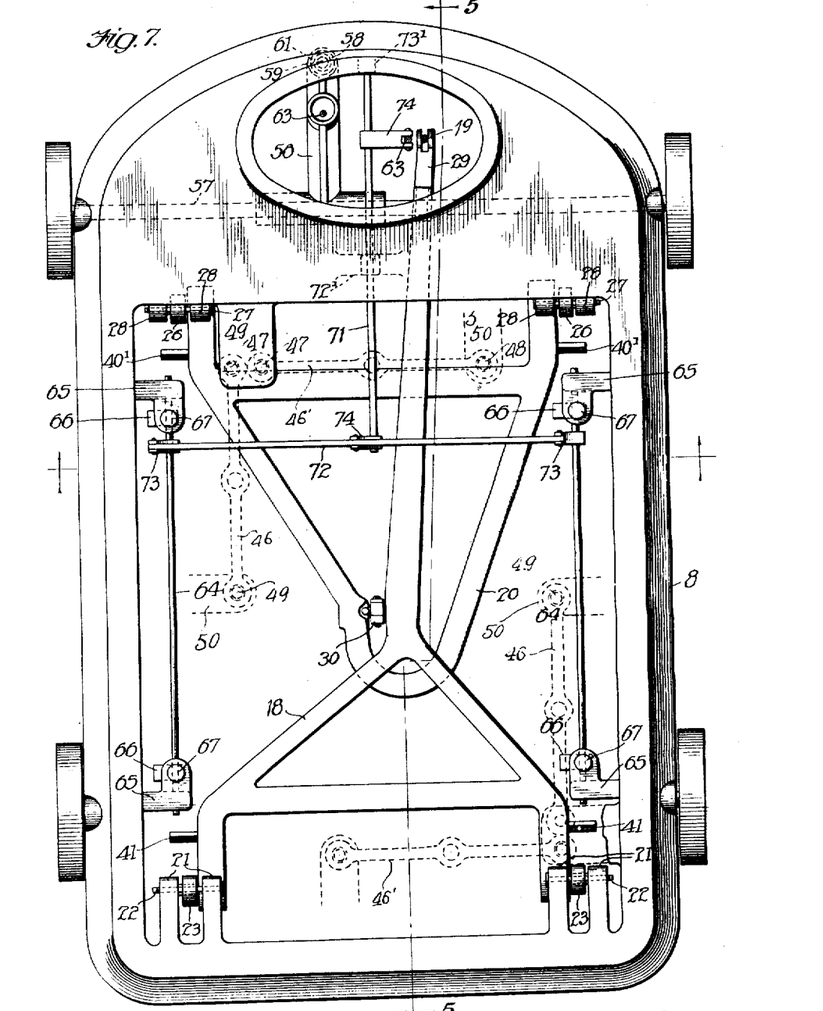
Fig. 7 is a horizontal plan partly in section on the line 7—7 of Fig. 5.
Figure 8:
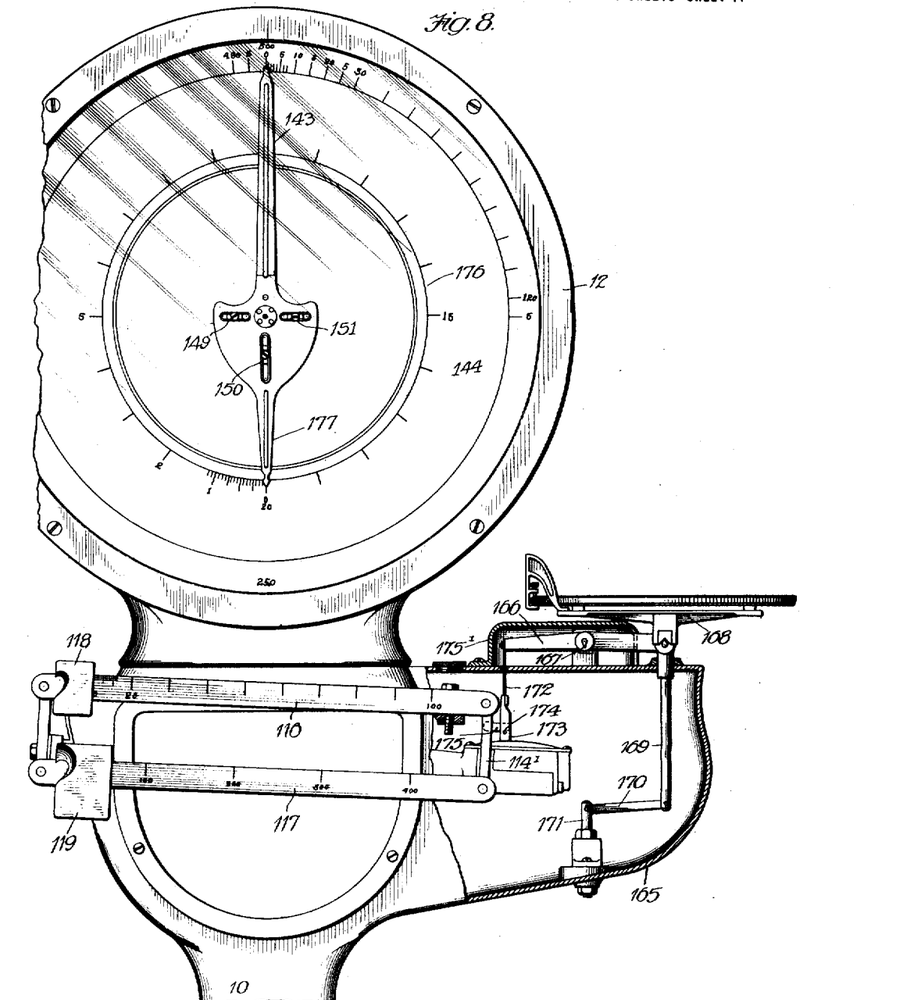

I will first describe the form of the invention shown in Figs. 1 to 7 inclusive; it being understood that the form shown in Fig. 8 is identical therewith except in the respects to be pointed out later. As usual in scales of this character the base 8 of my machine is mounted upon four wheels 9 and supports at one end a hollow post or standard 10 carrying at its upper end a beam and weight-indicating and load-offsetting means. In the present scale the beam proper is mounted in a chamber 11 cast with the column 10, and the load-offsetting means is contained in a casing 12 mounted upon the chamber or housing 11.

The base 8 contains as usual a leverage system for supporting the load-receiving platform, modified, however, to accommodate itself or be adapted to my invention. The base consists of a depending apron 18 and top 14 at the upper edge thereof, over an opening in which is bolted at 15 the hollow column before mentioned. The top is also open at 16 to permit the necessary connection between the leverage system and the load-supporting platform 17. The leverage system as is common in scales of this character comprises two levers of the second order, a main lever 18 pivoted at the front of the base but within its apron and connected to the scale beam by a link 19, and a second lever 20 pivoted or suspended at one end near the rear end of the base and connected to the main lever 18 at its forward end. (See Fig. 7.) On these two levers the platform is supported as usual though the particular means of support is novel. Within the base and preferably formed integral with the top thereof are two pairs of lugs 21, 21, located respectively upon opposite sides of the base near the front end thereof and supporting pins 22, 22 which receive the upper ends of loops or stirrups 23, 23, the lower ends of which have seats for knives 24, 24 projecting laterally from the lever 18 and forming the pivots thereof.

Figure 5:
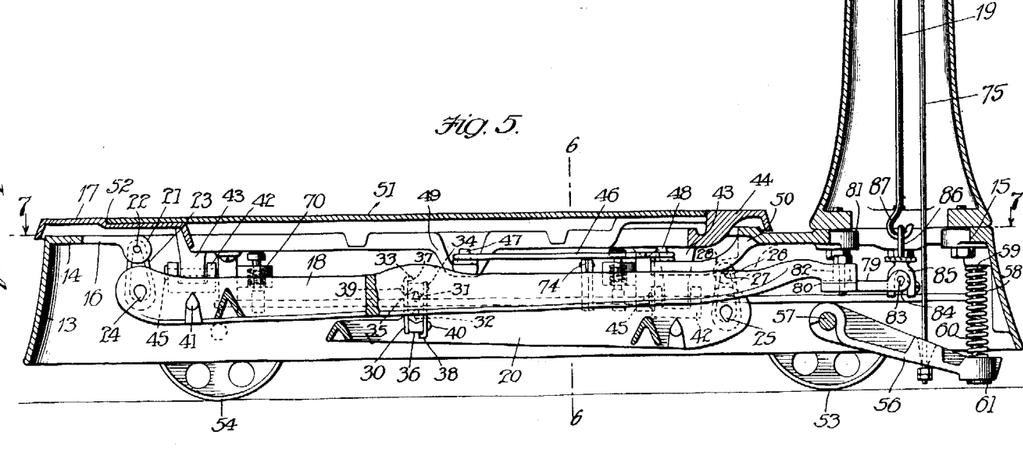
Fig. 5 is a longitudinal vertical section through the center of the base of the scale, parts, however, being shown in elevation.

The second lever 20 is similarly fulcrumed at the rear of the base, being provided for this purpose with knives 25, 25 supported in stirrups or loops 26, 26 depending from pins 27, 27 which extend through perforations in lugs 28, 28 projecting from the lower face of the top of the base. Both levers are cast as skeleton frames, although of somewhat different shape, as seen in Fig. 7, the main lever being formed with an extended arm 29 which is connected to the scale beam, in a manner to be hereinafter described, and the second lever is supported at its forward end from the main lever by means of a shackle or link 30, which connects knives 31 and 32 formed upon the main and second levers respectively. The shackle 30 comprises a pair of side plates 33, 34 between which are mounted bearings 35, 36 for receiving respectively the knife edges upon the levers, and the ends 37, 38 of the side plates are bent over substantially at right angles to limit the play of the bearings which are pivoted upon pins 39, 40 extending through the side plates. Each of the levers is provided with a pair of outwardly extending knives 40¹, 41 which support the scale platform upon which commodities to be weighed are placed. The location of these knives is best seen in Fig. 7, and in Fig. 5 is shown the construction by which the platform is supported thereon consisting of a set of U-shaped cradles 42, 42, one supported upon each knife edge, within which are pivoted legs 43, 43 depending from the under side of the platform frame 44. The cradles 42, as clearly appears in the drawing, are free to rock longitudinally of the base upon the knives upon which they rest, and the legs 43 are pivoted for lateral swinging movement upon the pins 45, 45 extending through the end members of the cradles and through the ends of the legs. By this construction the platform is free to move and adjust itself with relation to the levers in any direction, but it is held from excessive longitudinal and transverse movement by links 46, 46¹, engaging studs 47, 48 projecting from ears 49, 50, formed upon the platform frame and base respectively (see full lines in Fig. 5 and dotted lines in Fig. 7). A filling plate 51 resting within a rabbet or recess 52 formed in the frame completes the platform.

Figure 1:
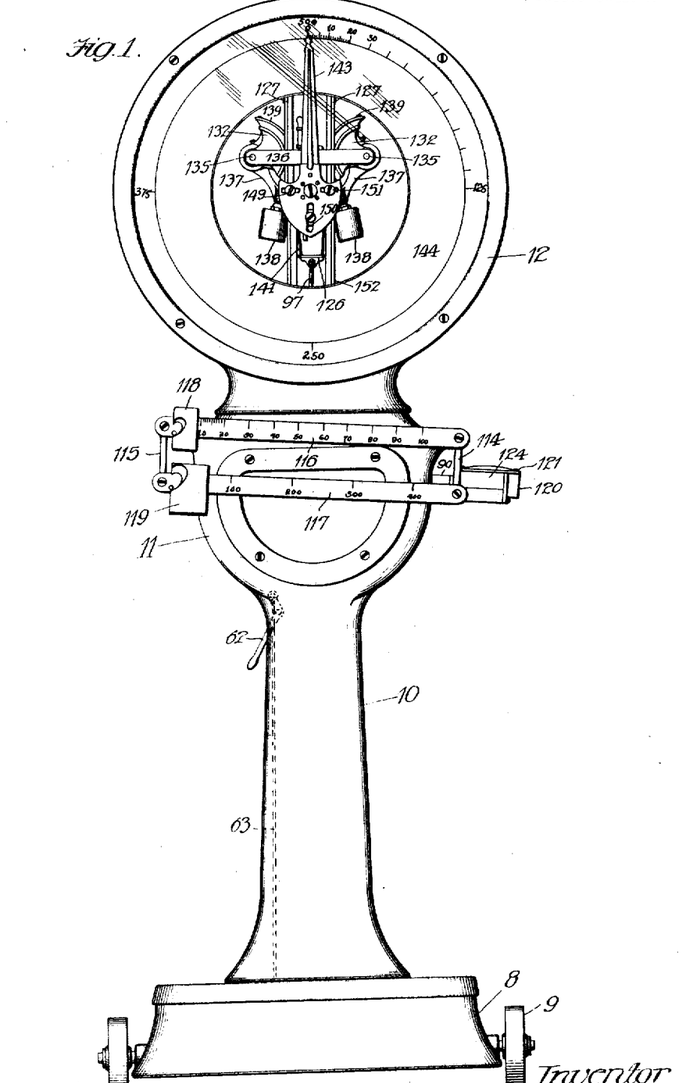
Fig. 1 shows the simpler embodiment of the invention in front elevation.

As heretofore stated, the base is as usual mounted upon wheels, shown at 9, 9 in the drawings, to facilitate moving the same when desired, and in order to prevent accidental shifting of the scale as, for example, when placing a heavy body upon it. I provide a brake which normally engages the floor upon which the scale rests. Referring more particularly to Figs. 1 and 5 of the drawings, this device is seen to consists of an arm 56 pivoted upon a rod 57 at the rear end of the base, and normally pressed into contact with the floor at its outer end by a spring 58 mounted upon pins 59 and 60 upon the base and end of the arm respectively. The outer end of the arm is preferably provided with a rubber or other friction facing 61 to grip the floor under the pressure of the spring. Intermediate its pivoted and free ends the arm 56 is engaged by a link rod 75 which at its upper end is secured to a crank 76 upon a cross shaft 77, having a handle 78 for turning the same. It will be understood that when the scale is to be moved the brake is drawn up by turning the handle 78 but that at all other times the handle and shaft are in position to permit the brake to remain in contact with the floor and prevent motion relative thereto.

In order to save the knife edges and other more delicate parts of the scale from injury and unnecessary wear it is desirable that the weight of the platform be removed therefrom when heavy articles to be weighed are placed upon the scale. With this purpose in view, I have provided a mechanism under convenient hand control for normally supporting the platform. This construction is best shown in Figs. 5, 6 and 7. It comprises a pair of longitudinal shafts 64, 64 revolubly mounted in brackets 65, 65 upon opposite sides of the scale base and carrying cams 66, 66 which are arranged to rotate beneath and raise the headed pins 67, 67 extending through lugs 68, 68, formed on the brackets, the heads of said pins being adapted to impinge against the flange 69 of the platform frame and raise the same when the cams are rotated in a proper direction for this purpose (see Fig. 6). If gravity is found insufficient for the purpose, the pins may be provided with springs 70 surrounding the same within the lugs 68 and which are so connected with the pins as to force them down against the surfaces of the cams. The rock shafts 64 are connected together and to an intermediate rock shaft 71 by a link 72 engaging arms 73—74 on the side and center rock shafts respectively. Rock shaft 71 is suitably mounted in bearings 72¹—73¹ and extends beneath the hollow column 10 where it is provided with an arm 74¹ connected to a link 63. The latter extends upward within the column to a convenient height where it is connected to a handle 62 (see Fig. 1). By turning the handle to the position shown in Fig. 1 the shafts 71 and 74 are in position with the cams thereof supporting the pins and platform above and away from its operative bearings. When, however, it is desired to use the scale, the article to be weighed is placed upon the platform and the latter then lowered to its bearings as above described.

The main lever is provided at its rear end with an extension 79 adjustably connected thereto by dove-tailing at 80, a bolt 81 extending through a longitudinal slot 82 in the main lever end (see dotted lines in Fig. 5) securing the parts together and permitting the adjustment referred to. The extension 79 is bifurcated at its outer end and provided with a knife 83 extending across the fork and supported upon a bearing 84 within a stirrup 85 hanging by a loop 86 from the hooked lower end 87 of link 19. The last named element extends upward within the hollow column and is hooked at 88 within a yoke 89 which straddles and depends from the scale beam 90. At its opposite ends the yoke is bifurcated, the forks being spanned by ties 91 which form seats for the pivots 92 mounted upon and extending through the beam. The latter is supported by its knives 93 upon bearings 94 mounted in brackets 95 projecting from the front and rear walls respectively of the main casting, and is connected by a yoke 96 similar in all respects to the yoke 89 heretofore described, with a link 97 which in turn is suspended from the automatic load-offsetting means to be presently described. A dashpot 98 mounted upon a bracket 99, supported by the frame, serves to reduce the vibrations of the beam and bring it quickly to rest, and an adjustable screw stop 100 engaging a boss 101 upon the beam limits its movement in one direction, while a similar screw stop 102 upon the other side of the fulcrum limits the swinging of the beam in the other direction, both these stops being adjustably mounted on the frame of the main casting.

In order to prevent injury to the beam and its associated parts when not in operation or when a heavy article or commodity is placed upon the platform, I provide means for lifting the beam from its fulcrum. For this purpose the bracket 99 before mentioned is formed with a forked end 104, which forms a guide for a rod 106 adapted to abut against the under face of the beam at 107. As shown, the rod is formed in two sections, the upper and inner of which (seen at 108) is adjustable by means of a screw connection with the main section 106, and the latter is provided with a spring 109 bearing against the under face of the upper forked member 104¹ and collar 109¹ to normally force the rod downward out of range of the swing of the beam. An arm 110 is pivoted to an extension of the bracket 99 and is engaged by a cam 111 on the manually operated cross-shaft 77, heretofore referred to, which cam is so related to the crank connection on said shaft by which the brake arm is lifted from the floor that when the handle 78 is turned to a position to perform the latter function, it also causes the cam 111 through the arm 110 to raise the rod 106, which lifts the beam 90 from its bearings, and holds it against stops 100 and 102 (see Fig. 3.)

At its opposite ends the beam extends through openings 112, 113 in the housing and is provided with bifurcated brackets 114, 115 which extend forwardly of the casing and support between them tare and capacity increasing beams 116, 117, these beams being provided, as shown, with sliding poises 118, 119. At its right hand end the main beam is further provided with a shot box 120 with a removable cover 121, and a weight 122, adjustable upon a screw 123 for sealing the scale. A cover 124, shown raised in Fig. 3, normally protects the said weight.

The link 97, before mentioned, is preferably formed in two sections connected by a turn buckle 125 to adjust the lengths thereof, and attached at its upper end to an equalizer bar 126 by which connection is made to the double load-offsetting mechanism. The last named device is formed of two similar pivoted members, a description of one of which will suffice for both.

Figure 2:
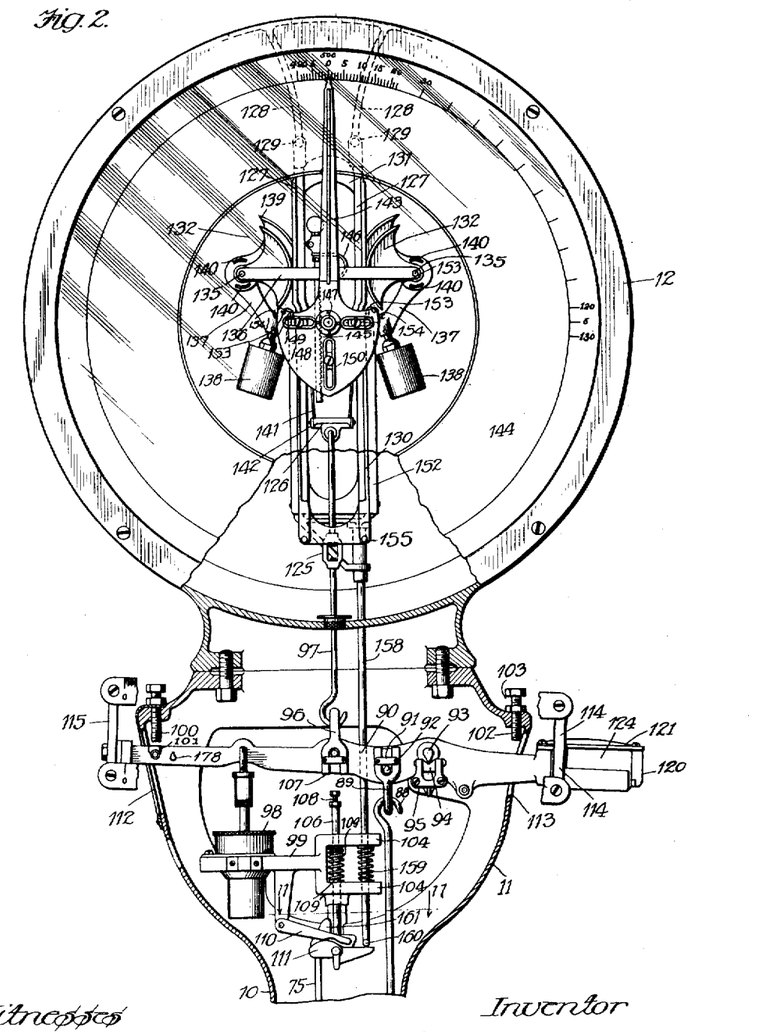
Fig. 2 shows a similar view of the upper part of the scale partially broken away, partially in vertical section, and on an enlarged scale showing the interior mechanism.
Figure 3:
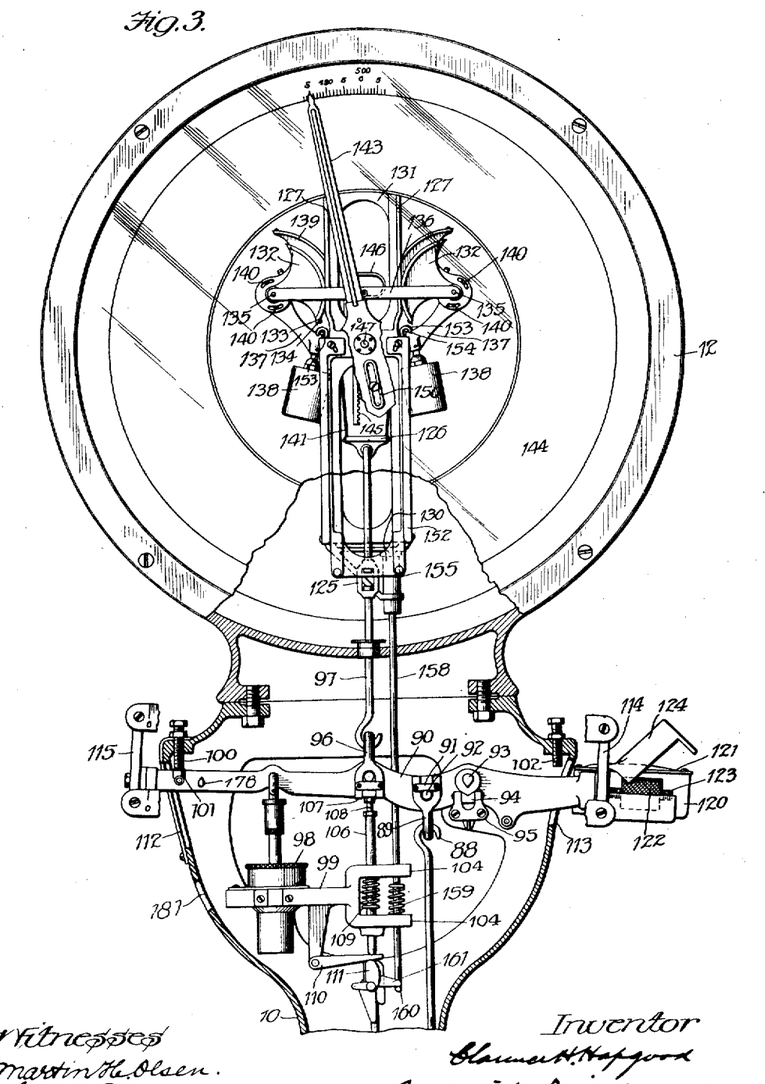
Fig. 3 is a similar view but with the parts in a different position, as will be presently described.

A rectangular frame comprising four vertical pillars 127, 127, is suspended from the annular wall of the cylindrical casing 12 by brackets 128, 128 to which it is connected by screws or rivets 129, 129. The pillars are secured together at top and bottom by cross pieces 130—131 and form bearings or tracks for rocker segments 132—132 which have rolling contact thereon, being supported in position by flexible ribbons 133 of steel or other suitable metal fastened to the lower ends of the segments as at 134 and to the upper ends of the pillars, being thus interposed between the pillars and the segments at every position of the latter. The segments 132 are four in number, there being a pair upon each side of the rectangular frame, the members of each pair being secured to a common shaft 135—135, and the two shafts connected together by pivoted cross strips 136. The segment shafts and cross strips together form a frame which is movable vertically upon the pillars. To each shaft 135 is affixed a pendulum consisting of a bent arm 137—137 and a weight 138—138, the normal position of the pendulum being as shown in Figures 2 and 3 of the drawings. Intermediate the members of each pair of supporting segments 132 is a somewhat larger segment 139 which is also fixed to the shaft thereof with provision for adjustment indicated by the slots 140—140, said segment extending at its periphery between the pillars upon the same side of the rectangular frame and connected at its upper end to a metallic ribbon 141—141 which extends over the arcuate face of the segment and is attached at its lower end as at 142 to the equalizer bar 126. As above stated, the construction on both sides of the weight-offsetting means is the same, and the ribbons 141 being attached to opposite ends of the equalizer bar 126 which is pivoted to the link 97, if the scale be slightly tilted in the plane of the face of the dial and both pendulums thereby shifted in the same direction, it will have no effect upon the position of the link 97 since the amount of ribbon taken up upon one segment will be compensated by that given up by the other, the equalizer bar tilting slightly to adjust itself to the unequal lengths of the ribbons. An indicator hand 143 is pivoted concentric with the indicator dial 144 and the casing 12, and is revolved from the vertically movable frame by a rack 145 attached by a spring 146 to the latter and in mesh with a gear 147 shown in dotted lines on Fig. 2 on the journal of the hand. The hand is formed of sheet metal and on opposite sides of and beyond its pivoted point is expanded into a plate 148 which is slotted at 149—150 to receive small adjustable weights 151—151 for accurately counterbalancing the hand.

Figures 4, 9, 10, 11:
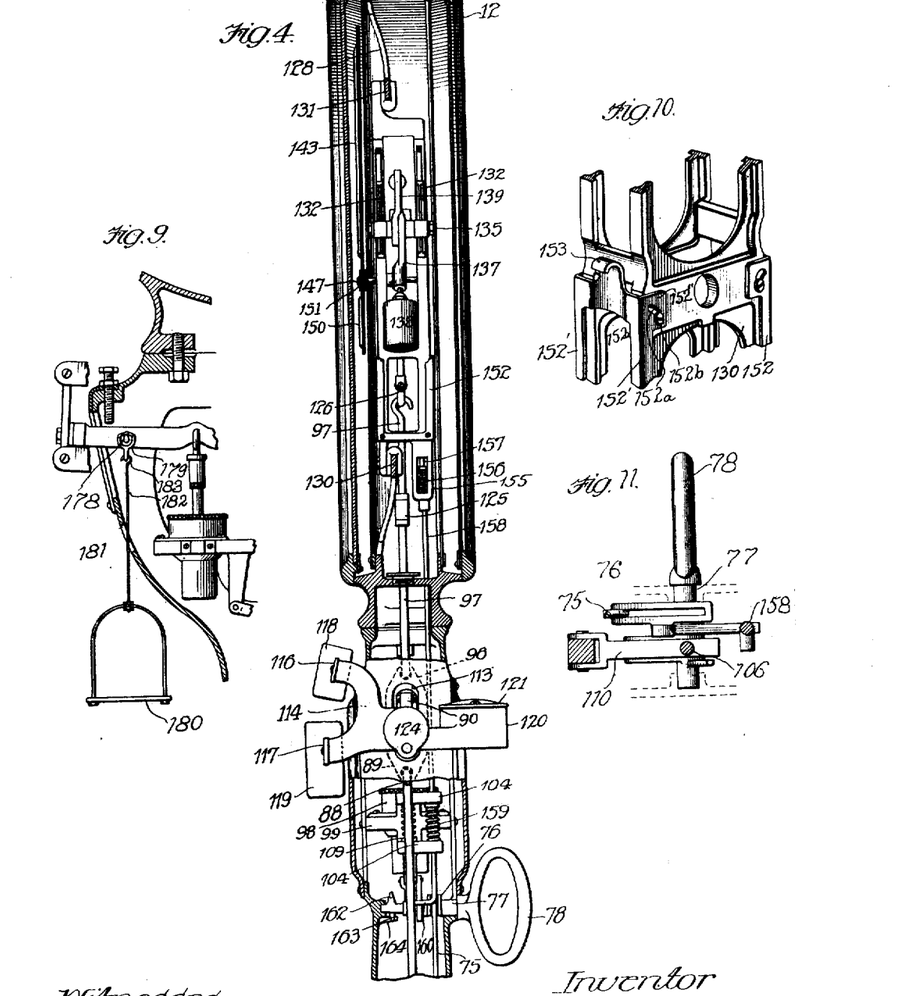
Fig. 4 is a central vertical section of the same portion of the scale on a plane at right angles to that of Figs. 1 and 2, showing the interior mechanism, however, in elevation.
Fig. 9 is a vertical section showing a detail.
Fig. 10 is a fragmentary perspective on an enlarged scale showing a detail of one of the means provided for preventing injury to the scale.
Fig. 11 is a horizontal section on the line 11—11 of Fig. 2 on a somewhat enlarged scale.

In order to lock the pendulums from motion when the scale is being shipped I provide the mechanism best shown in Figs. 2 and 10 comprising a frame 152 mounted to slide upon the vertical pillars 127 and the carrying hooks 153—153 which engage in notches or recesses 154—154 formed above the bends or elbows in the pendulums (see Fig. 3). The hooks 153 are formed upon the upper ends of the resilient side members 152¹—152¹ of the sliding frame and the latter are formed with lugs 152″—152″ which embrace the stationary frame and are slotted as at 152ª to receive screws 152ᵇ which serve as guides for the upper end of the frame. The shape of the slots is such that when the frame is drawn downwardly to bring the hooks 153 into engagement with the pendulums, the movement of the side members is inward as well as downward, thus drawing the pendulums in as they are locked. At its lower end, the sliding frame carries a barrel 155 containing a spring 156 which extends between the bottom of said barrel and a button 157 upon the upper end of a connecting rod 158 which the spring surrounds, there being thus formed an elastic connection between the frame and the rod 158. The latter extends downwardly through perforations in the fork 104, above described, between the tines of which it is provided with a spring 159 which normally forces it upward. The connecting rod 158 extends below the fork and terminates in a perpendicular offset 160 which extends into the path of a cam 161 upon the cross-shaft 77 above referred to, which is so placed upon the shaft with respect to the cams which elevate the scale beam and raise the brake respectively, that immediately after these functions are accomplished and especially after the beam has been raised, the cam 161 through the link 158 and frame 152 draws the hooks 154 into engagement with the notches in the pendulum arms and thereby locks the latter in their pendant position. The cross shaft 77 is limited in its oscillation by lugs 162—163 thereon engaging lug 164 formed upon the interior of the column 10. When the scale is not in use the handle 78 on the cross shaft 77 may be turned into locking position, and, by the mechanism heretofore described, the brake lifted from the floor, the beam lifted from its fulcrum and the pendulums which in the meantime, in case a weight has been placed upon the scale, and removed therefrom, have come to rest in the pendant position, are locked by the hooks upon the movable frame. The mode of operation of a platform scale of this character is well-known, and need not here be described; and the operation of the double pendulum construction will be readily understood, the imposition of a weight upon the platform depressing that end of the beam to which the load-offsetting means is attached, which in turn draws upon the equalizer bar and not only swings the pendulums outwardly but lifts the vertically movable frame as a whole until the structure is again in equilibrium. The displacement of the pendulums is indicated by the hand 143 and may be read in terms of units of weight upon the dial.

Turning now to the form of the device in which provision is made for weighing lighter articles or quantities of commodities shown in Figure 8, the chamber or enlargement of the upper end of the column 10 is expanded as seen at 165 to enclose the shot box and to support a beam 166 fulcrumed at 167, and carrying at its outer end a small scale pan 168 having a check rod 169 extending into the enlarged chamber and connected by a link 170 with a stationary post 171. The opposite arm of the lever 166 is connected by a ribbon 172 and stirrup 173 of any approved construction with a pivot 174 mounted upon a bracket 175 extending from the member 114′ by which the tare and capacity beams are supported from the main beam.

The housing is formed with an opening at 174′ through which the connection 172 extends and a shield 175 extends over the opening and auxiliary beam. The beam 166 being connected to the end of the main scale beam, it is obvious that a comparatively small load upon the platform 168 will have a much greater torsional effect upon the beam and upon the load-offsetting means than would the same load if applied to the main platform. When the scale is provided with this auxiliary weighing device the dial bears an additional series of indications shown at 176 with which an oppositely extending finger 177 upon the main indicating hand co-operates.

It is often desirable to adjust or seal a scale after it has been located for service and particularly after it has been in use a considerable time. This involves the use of tested weights upon the platform which must aggregate the capacity of the scale or as near it as it is thought necessary to adjust the apparatus. In the case of scales of the size for which the present invention is particularly intended, this involves the transportation of weights of very large size to the location of the scale. In order to obviate this inconvenience I have provided the attachment for the beam which is shown in Fig. 9. Upon the latter at a suitable point as at 178, Figs. 3 and 9, is mounted a knife upon which is supported a yoke 179 which in the ordinary operation of the scale is idle. When, however, it is desired to seal or adjust the scale I suspend a weight receptacle from the yoke 179, the attachment being made through an opening 181 in the housing of the scale by means of a strap or bar 182 with a hook 183. The weight receptacle being outside the casing is readily accessible for the application thereto and removal therefrom of test weights and by reason of the length of the arm between said knife and the fulcrum of the beam as compared to the length of the arm to which the scale platform is attached, the test weights employed in sealing the scale need be only a small fraction of the capacity of the scale.

I claim:

1. In a scale of the class described having a pendulum load-offsetting means and in combination therewith a vertically-movable hook adapted to directly engage and lock the pendulum, and means for moving the hook.

2. In a scale of the class described having a pendulum load-offsetting means, means movable into engagement with the pendulum substantially in the vertical plane of the pivot thereof and at a point below its pivot and adapted to lock it against movement in either direction.

3. In a scale of the class described having a pendulum load-offsetting means, means beneath the pivot of the pendulum movable into engagement with the pendulum substantially in the vertical plane of its pivot to lock it in normal position, and a device for normally maintaining said means out of engagement with the pendulum.

4. In a scale of the class described having a pendulum load-offsetting means and in combination therewith means adapted to be moved vertically into engagement with the pendulum and give an inward pressure thereon to lock the pendulum from movement.

5. In a scale of the class described, a pair of load-offsetting pendulums, and a single locking device for locking both pendulums against movement.

6. In a scale of the class described, a pair of load-offsetting pendulums, and a single locking device movable into positive engagement with the pendulums and arranged to lock both pendulums against movement.

7. In a scale of the class described, a plurality of load-offsetting pendulums, and a single locking device having a member for engaging each pendulum and securing it against movement.

8. In a scale of the class described, a plurality of load-offsetting pendulums, and vertically-movable locking means for engaging all of said pendulums and securing them against movement.

9. In a scale of the class described, a plurality of load-offsetting pendulums, locking means for each of said pendulums arranged to be moved into engagement with the pendulum and secure it against movement, and means for simultaneously moving said locking means.

10. In a scale of the class described, a pair of spaced oppositely-disposed pendulums, and locking means arranged between and adapted to engage both pendulums to lock them against movement.

11. In a scale of the class described, a pair of spaced oppositely-disposed pendulums, and locking means arranged between and adapted to engage both pendulums to lock them against movement, said locking means being downwardly movable into engagement with said pendulums.

12. In a scale of the class described, a pair of spaced oppositely-disposed pendulums, and locking means arranged between the pendulums and having oppositely-extending members adapted to be moved into engagement with the pendulums to secure them against movement.

13. In a scale of the class described, a pair of load-offsetting pendulums, and locking means including a vertically-movable frame having projecting hooks arranged to engage the pendulums and secure them against movement.

14. In a scale of the class described having a pendulum load-offsetting means, a stationary frame support, a frame mounted to slide thereon, a hook carried by the frame and adapted to directly engage and lock the pendulum, and means for reciprocating the sliding frame.

15. In a scale of the class described, a load-offsetting means comprising a stationary frame having vertical pillars, a pair of pendulums upon the axes of which are mounted segments which bear against said pillars, means connecting the segments to the pillars, connections from the pendulums to the beam, a frame mounted to slide on said stationary frame and carrying hooks adapted to engage and secure the pendulums against movement, and connections from said sliding frame to the beam of the scale.

16. In a scale of the class described having a pair of load-offsetting pendulums each provided with a pair of segments, vertical tracks upon which said segments oscillate, flexible bands connecting said segments to the tracks and intermediate segments between the segments of each pair, flexible connections from said intermediate segments to the scale beam, a sliding carriage having means for engaging and locking the pendulums, and means for operating the carriage.

17. In a scale of the class described, a pair of load-offsetting pendulums, means connecting the same to the scale beam, a vertically reciprocating slide frame carrying means adapted to engage and lock the pendulums, a rod 158 for reciprocating said slide frame, and a cross shaft having a cam for reciprocating said rod.

18. In a scale of the class described, a pair of load-offsetting pendulums, means connecting the same to the scale beam, a vertically reciprocating slide frame carrying means adapted to engage and lock the pendulums, a rod 158 for reciprocating said slide frame, a spring connection between said rod and slide frame, and a cross shaft having a cam for reciprocating said rod.

19. In a scale of the class described having a beam 90, load-offsetting means comprising a pair of pendulums, a vertically sliding frame having a pair of hooked members adapted to engage the pendulums, a rod 158 for reciprocating the frame, a spring connection between said rod and frame, a spring 159 normally elevating the rod, and a cam 161 for depressing the same.

20. In a scale of the class described, a beam, a stop for limiting the upward movement of one end of the beam, and means adapted to engage the beam between its fulcrum and said stop and raise it from its bearings, the stop acting as a fulcrum.

21. In a scale of the class described having a beam, a stop for limiting the upward movement of one end of the beam, a vertical sliding rod engaging the beam and tilting it about said stop as a fulcrum, means for limiting such tilting movement, and means for reciprocating the rod.

22. In a scale of the class described having a beam, stationary bearings therefor, a reciprocating rod adapted to engage and lift the beam from its bearings, a spring for normally holding the rod out of engagement with the beam, and means for raising the rod.

23. In a scale of the class described having a beam 90, stationary bearings therefor, a vertically reciprocating rod engaging and lifting the beam, a spring for normally depressing the rod, and a cam for raising the same.

24. In a scale of the class described having a beam 90, a vertically reciprocating rod engaging the beam, a spring for normally depressing the rod, an arm 110 adapted to bear upon the lower end of the rod, and a cam for engaging and raising said arm.

25. In a scale of the class described and in combination with a beam 90 thereof, an extensible rod 106 having a spring normally forcing the same downward, an arm 110 engaging the end of the rod, and a cam 111 for engaging the arm and lifting the rod.

26. In a scale of the class described having a beam 90, a vertically movable rod 106 adapted to engage and raise the beam, a spring 109 normally retracting the rod, and means for engaging the rod to elevate the same.

27. In a scale of the class described having a beam 90, a vertically movable rod 106 adapted to engage and raise the beam, a spring 109 normally retracting the spring, an arm 110 engaging the rod, and a cam 111 for swinging the arm.

28. In a scale of the class described and in combination with the beam thereof, a vertically reciprocating rod, a spring normally tending to hold the rod depressed and out of engagement with the beam, a pivoted arm 110 engaging the end of the rod, a cross shaft having a handle for turning the same, and a cam 111 engaging the arm 110 to lift the same.

29. In a scale of the class described having a pendulum load-offsetting means, a beam and a connection between said means and beam, the combination with said elements of means for lifting the beam off its pivots, and means for locking the pendulum against movement.

30. In a scale of the class described having a pendulum load-offsetting means, a beam, and a connection between the beam and load-offsetting means, for operating the latter from the former, the combination with said elements of vertically-movable means arranged to engage and lift the beam from its pivots, vertically-movable means substantially in the vertical plane of the pivots of the pendulum for locking the pendulum against movement, and means common to said lifting and locking means for giving them vertical movement.

31. In a scale of the class described and in combination with the beam thereof, a pair of pendulums constituting the load-offsetting means, a vertically-reciprocating frame for locking the pendulums, a vertically-reciprocating rod adapted to engage and lift the beam, and a shaft having a handle for turning the same, and a pair of cams adapted to lift the frame and the sliding rod respectively.

32. In a scale of the class described and in combination with the beam and load-offsetting pendulums thereof, vertically-reciprocating means for locking the pendulums, vertically-reciprocating rod for lifting the beam off its bearings, and a cam shaft for operating the lifting rod and pendulum locking means.

33. In a scale of the class described and in combination with the beam and double pendulum load-offsetting means thereof, a rod 106 adapted to engage and lift the beam, a vertically-moving carriage having means for engaging and locking the pendulums, a rod 158 for reciprocating said carriage, a bracket 99 having a forked end, springs between the arms of the bracket for normally depressing the rod 106 and elevating the link 158, and means extending beneath the rod 106 and link 158 and adapted to lift the one and depress the other.

34. In a scale of the class described having a beam 90 and a load-offsetting pendulum, the combination with said members of means for raising the beam, means for locking the pendulum, and means for first operating the beam lifting means and then the pendulum locking means.

35. In a scale of the class described having a beam 90 and a pair of load-offsetting pendulums, a rod 106 for raising the beam from its pivots, a sliding frame carrying means to engage the pendulums and retain them in lowered position, a link 158 for reciprocating the carriage, and a cross shaft 77 having cams for operating said link and rod respectively.

36. In a scale of the class described having a beam 90, a pair of pendulums 138 connected together and to the beam for offsetting the load upon the latter, segments 132 and tracks 127 upon which said segments rock, an operating frame 152 mounted upon the tracks 127 and carrying means for locking the pendulums in depressed position, a link 158 for operating the carriage and resiliently connected thereto, a bracket 99 having arms 104—104' through which the link 158 extends, a spring intermediate the bracket arms, and a crank shaft 77 having a crank thereon for engaging the link 158 and drawing the locking means into engagement with the pendulum.

37. In a scale of the class described having a beam 90, an extensible rod 106 slidingly mounted for vertical movement and adapted to engage the beam, a spring 109 normally holding the rod out of engagement with the beam, an arm 110 engaging the rod, and a crankshaft having a cam 111 engaging and operating the arm.

38. In a scale of the class described having a platform, a beam and automatic load-offsetting and indicating means, a longitudinally-adjustable weight carried by the beam, and a pivoted covering for protecting the same.

39. In a scale of the class described having a platform, a beam, automatic load-offsetting means, connections between the platform, beam and load-offsetting means, a housing in which the beam is mounted and beyond which it extends at its ends, transverse members 114—115 secured to the beam and carrying tare and capacity beams.

40. In a platform scale, a platform, a system of levers upon which the platform is mounted, a beam, automatic weight indicating means, connections between the system of levers and the beam, an auxiliary beam carrying a scale pan, and connections from the auxiliary beam to the main beam.

41. In a platform scale, a platform, a system of levers upon which the platform rests, a beam connected to the system of levers, automatic load-offsetting means having an automatic weight indicator operated thereby, an auxiliary beam connected to the main beam near one end thereof, a shield 175 for protecting said auxiliary beam, a scale pan mounted upon the latter, a check rod 169 depending from the scale pan, a check link 170 a housing enclosing the main lever and into which the check rod extends, and a dial provided with sets of weight indications corresponding to the leverage of the main platform and scale pan respectively.

42. In a scale of the class described and in combination with the base, platform and levers thereof, a series of vertically-movable pins adapted to engage and raise the platform, a series of lugs in which the pins are guided, shafts extending beneath the pins and carrying cams for raising the latter, a link connecting the shafts, a shaft connected to the link for operating the same, an arm on the last-named shaft, a link connected to said arm, and a lever for operating the link.

43. In a scale of the class described, a platform, a leverage system upon which the platform rests during weighing operations, and automatic load-offsetting means including a pendulum, in combination with means for lifting the platform from its pivot bearings and supporting the same, and means connected to said platform-lifting means for locking the pendulum.

44. In a scale of the class described, comprising a platform, a leverage system upon which the platform rests during weighing operations, a beam, connections between the beam and leverage system, and automatic load-offsetting and indicating means comprising a pendulum and connected to the beam, in combination with means for lifting the platform from its pivots and supporting the same, means for lifting the beam from its pivot bearing, and means for locking the pendulum.

45. In a scale of the class described, a platform, a leverage system upon which the platform rests during weighing operations, a beam, and connections between the beam and leverage system, in combination with means for lifting the platform from its pivots and supporting the same, and means connected to said platform-lifting means for lifting the beam from its pivot bearings.

46. In a scale of the class described having a base, a system of leverage therein, and a platform mounted on the leverage system, the legs projecting downwardly from the platform, castings in which the legs are pivotally secured, and knives upon the leverage system supporting the castings.

47. In a scale of the class described, comprising a base, a leverage system within the base, and a platform supported thereby, knives projecting laterally from the leverage system, cradles supported on the knives, and legs projecting from the platform and pivotally secured to the cradles transversely of the knives, whereby universal movement and adjustment of the parts is permitted.

48. In a scale of the class described, in combination, weighing mechanism including a platform and a beam, and mechanically-connected means for simultaneously raising said platform and lifting said beam from its pivot bearings.

49. In a scale of the class described, in combination, weighing mechanism including a platform and a pendulum, and mechanically-connected means for simultaneously raising said platform and locking said pendulum.

50. In a scale of the class described, in combination, weighing mechanism including a platform, a beam and a pendulum, and means for simultaneously raising said platform and lifting said beam from its pivot bearings and locking said pendulum.

51. In a device of the class described, in combination, a plurality of load-offsetting pendulums, means supporting said pendulums for rocking movement, commodity-receiving means, connections from said commodity-receiving means to said pendulums, and means for simultaneous engagement with said pendulums to lock them against movement.

52. In a device of the class described, in combination, a pair of load-offsetting pendulums, means supporting said pendulums for opposite swinging movement, commodity-receiving means, connections from said commodity-receiving means to said pendulums, and means for simultaneously locking said pendulums against swinging movement.

CLARENCE H. HAPGOOD.

Witnesses:
EDWARD F. ULRICH,
CLARENCE W. FESSENDEN.